United States Patent
McCalmont et al.

(10) Patent No.: US 6,719,503 B1
(45) Date of Patent: Apr. 13, 2004

(54) TUNED DAMPED ABSORBER SUPPORT

(75) Inventors: Paul E. McCalmont, Cincinnati, OH (US); Mark D. Kohring, West Chester, OH (US); Dennis A. Burt, Springboro, OH (US); Miles E. Loretta, Cincinnati, OH (US)

(73) Assignee: Unova IP CORP, Woodland Hills, CA (US)

( * ) Notice: Subject to any disclaimer, the term of this patent is extended or adjusted under 35 U.S.C. 154(b) by 0 days.

(21) Appl. No.: 09/948,728

(22) Filed: Sep. 7, 2001

(51) Int. Cl.[7] .............................................. B23Q 11/00
(52) U.S. Cl. ........................ 409/141; 409/235; 267/137; 267/140.5; 188/378; 188/380
(58) Field of Search ................................. 409/141, 235; 408/234; 188/268, 378, 379, 380; 267/137, 140.5

(56) References Cited

U.S. PATENT DOCUMENTS

| | | | |
|---|---|---|---|
| 1,965,224 A | * | 7/1934 | Ernst et al. .................. 409/141 |
| 2,275,783 A | * | 3/1942 | Martellotti .................. 409/236 |
| 2,393,907 A | * | 1/1946 | Herfurth ..................... 409/141 |
| 2,412,499 A | * | 12/1946 | Ernst et al. .................. 409/141 |
| 2,714,823 A | * | 8/1955 | Dall et al. ..................... 74/574 |
| 2,931,464 A | * | 4/1960 | Zwick .......................... 188/83 |
| 3,230,831 A | * | 1/1966 | Harker ........................ 409/141 |
| 3,447,402 A | | 6/1969 | Ray |
| 3,522,864 A | | 8/1970 | Richter |
| 3,790,153 A | | 2/1974 | Seidenfaden |
| 3,967,515 A | * | 7/1976 | Nachtigal et al. ............. 82/118 |
| 4,438,599 A | | 3/1984 | Kamman |
| 4,468,019 A | | 8/1984 | Staudenmaier |
| 4,512,068 A | | 4/1985 | Piotrowski |
| 4,630,811 A | | 12/1986 | Ridisill |
| 4,669,227 A | | 6/1987 | Treppner |
| 4,921,378 A | | 5/1990 | Kytola |
| 5,025,529 A | * | 6/1991 | Hult et al. ..................... 15/344 |
| 5,033,340 A | | 7/1991 | Siefring |
| 5,058,261 A | | 10/1991 | Kitamura |
| 5,336,024 A | * | 8/1994 | Nakagawa et al. ......... 408/1 R |
| 5,871,315 A | | 2/1999 | Burt |
| 5,913,955 A | * | 6/1999 | Redmond et al. ............ 82/1.11 |
| 5,954,169 A | * | 9/1999 | Jensen ....................... 188/378 |
| 6,296,093 B1 | * | 10/2001 | Norris et al. ............... 188/378 |

FOREIGN PATENT DOCUMENTS

JP           15653 A   *  1/1982  ................. 409/141

* cited by examiner

Primary Examiner—Daniel W. Howell
(74) Attorney, Agent, or Firm—Daniel C. Stelter; James C. Eaves, Jr.

(57) ABSTRACT

With high speed machine tools, there is a desire to dampen vibrations and to retain the damper mass in proper position. The present invention relates to a tuned damped absorber support providing simultaneous energy dissipation in both horizontal and vertical directions which also provides for proper mass position retention. The tuned damped absorber assembly is attached directly or indirectly to a machine component requiring damping. Both single damper mass and double damper mass configurations are shown. With a double damper mass, the system can be tuned to two different frequencies. Therefore, the double damper mass provides for optimization in both a vertical and a horizontal direction.

17 Claims, 6 Drawing Sheets

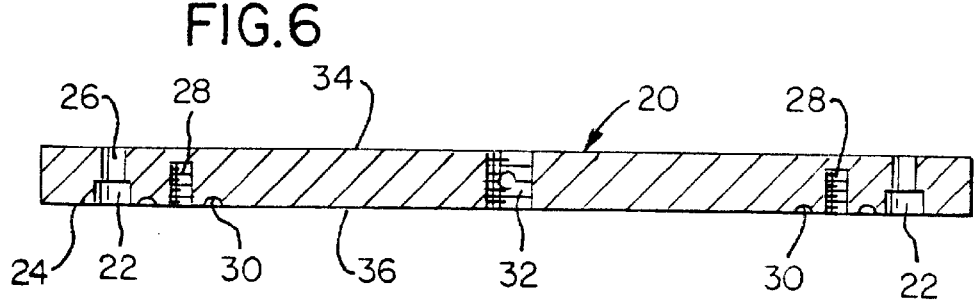
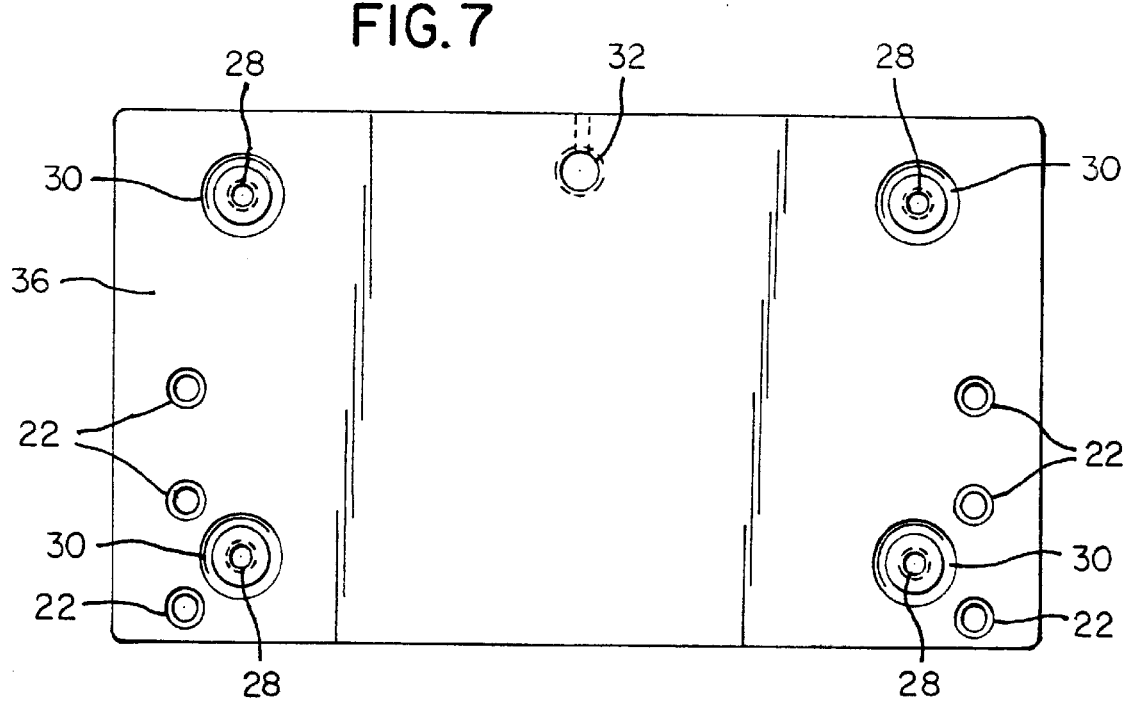

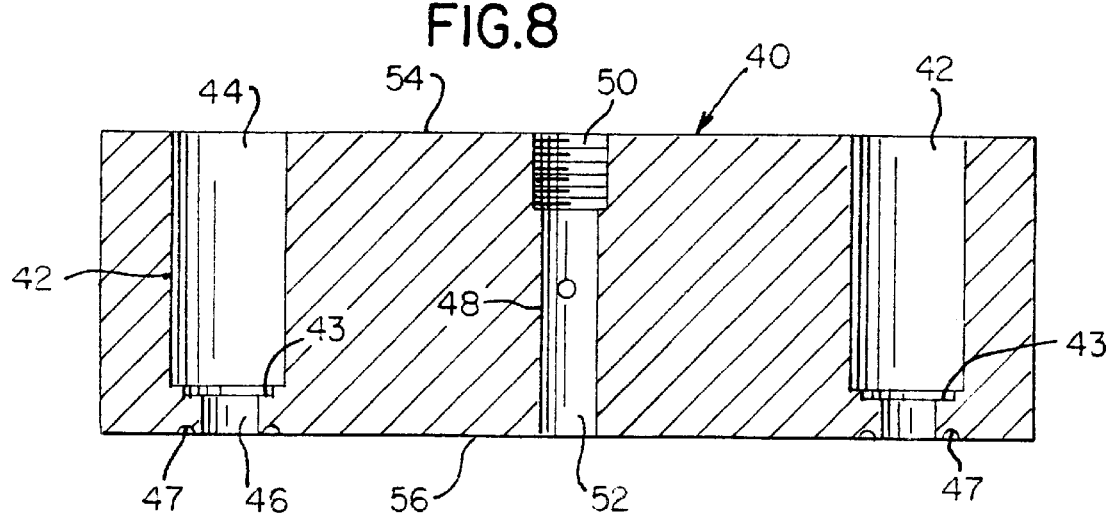
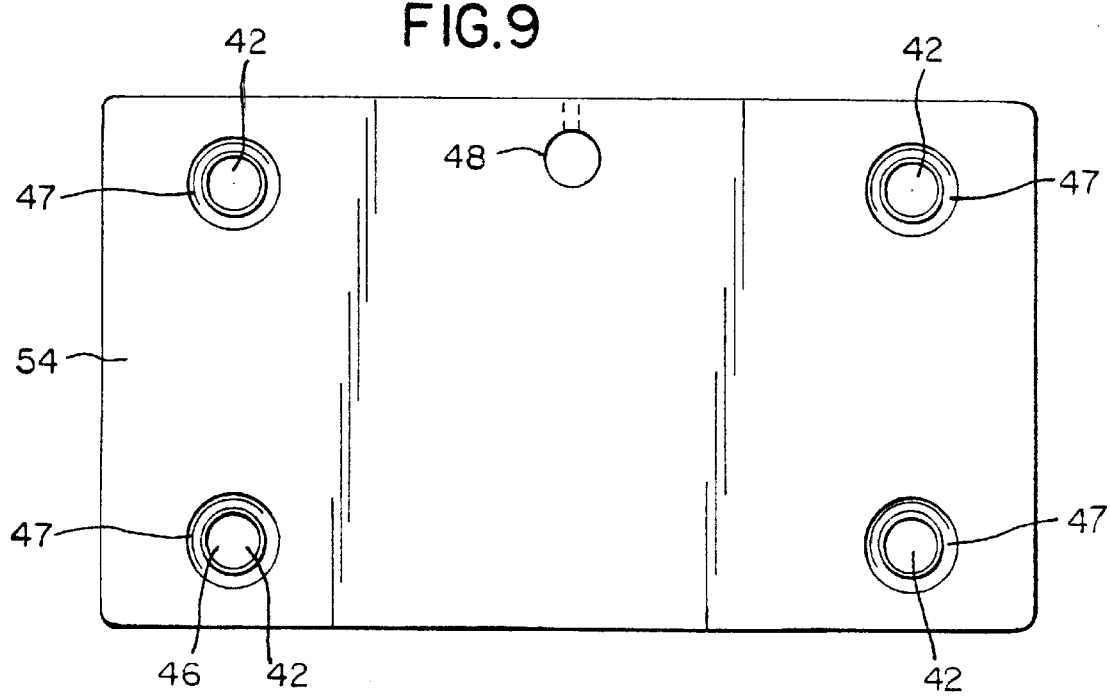

TUNED DAMPED ABSORBER SUPPORT

BACKGROUND OF THE INVENTION

1. Technical Field of the Invention

With high speed machine tools, there is a desire to damp vibrations resulting from, for example, acceleration and deceleration of machine components along the machine's axes of motion or from chatter vibrations inherent in the cutting process. One known method of damping such vibrations includes attaching a damper mass assembly to the machine component to be damped, and tuning the frequency of the response of the damper so that it is close to the frequency of the unwanted vibration of the machine component.

In some cases, it is desired to provide damper tuning on the component at more than one vibration frequency, or in more than one principal direction. In such cases, there is a desire to retain the attached damper mass in proper position and to provide flexibility in the damper's ability to act in the proper direction(s). The present invention relates to a tuned damped absorber support providing simultaneous energy dissipation in both horizontal and vertical directions which also provides for proper mass position retention.

2. Brief Description of the Related Art

Prior art vibration damping systems that are used to address more than one vibration frequency or more than one principal direction have generally utilized either multiple damper mass assemblies applied independently or damping elements applied in preselected, fixed orientations on a single damper mass to act in both shear and compression. Rods are found in the prior art to hang a damping mass that is required to have a vertical shear plane. This rod hanging application freely allows damping action in the horizontal direction along the shear plane, but renders any damping action in the vertical direction ineffective.

The following U.S. patent references are cited: U.S. Pat. No. 5,871,315, Burt et al., issued Feb. 16, 1999, for a tombstone fixture; U.S. Pat. No. 5,058,261, Kitamura, issued Oct. 22, 1991, for a machine tool; U.S. Pat. No. 5,033,340, Siefring, issued Jul. 23, 1991, for an apparatus and method for tool vibration damping; U.S. Pat. No. 4,921,378, Kytola, issued May 1, 1990, for a rotary-pallet system; U.S. Pat. No. 4,669,227, Treppner, issued Jun. 2, 1987, for an angle plate apparatus with precisely adjustable workpiece holder; U.S. Pat. No. 4,630,811, Rudisill, issued Dec. 23, 1986, for a model fixturing apparatus; U.S. Pat. No. 4,512,068, Piotrowski, issued Apr. 23, 1985, for a pallet receiver with compliant pin and socket registration; U.S. Pat. No. 4,468,019, Staudenmaier, issued Aug. 28, 1984, for a pallet clamping system for machine tools; U.S. Pat. No. 4,438,599, Kamman et al., issued Mar. 27, 1984, for a vibration damper for machine-carried workpiece; U.S. Pat. No. 3,790,153, Seidenfaden, issued Feb. 5, 1974, for equipment for holding workpieces; U.S. Pat. No. 3,522,864, Richter, issued Aug. 4, 1970, for a tuned damper assembly for machine tools; U.S. Pat. No. 3,447,402, Ray, issued Jun. 3, 1969, for a damped tuned boring bar; and, U.S. Pat. No. 2,714,823, Dall et al., issued Aug. 9, 1955, for a vibration damper.

SUMMARY OF THE INVENTION

The present invention relates to a tuned damped absorber support assembly for machine tools providing simultaneous energy dissipation in at least two directions of motion to attenuate vibrations of the machine tool resulting from machine operation. The tuned damped absorber assembly of the present invention, oftentimes referred-to herein as an "attachment assembly", is attached directly or indirectly to a machine component requiring damping. Both single damper mass and double damper mass configurations are shown. With a double damper mass, the system can easily be tuned to two different frequencies by independent adjustment of the damping elements. The single damper mass is typically applied for tuning of a single frequency, but could also be tuned for two different frequencies by providing a support rod with non-symmetric cross section.

Even more particularly, the preferred embodiment of the present invention is an attachment assembly to be attached to a machine component to accomplish energy dissipation simultaneously in both a horizontal direction and a vertical direction, where the attachment assembly comprises a damper mass having a rod bore therethrough from a bushing face to a component face, the rod bore having a threaded bushing receiving portion extending from the bushing face toward the component face and a rod receiving portion extending from the component face toward the bushing face; the damper mass having at least one preload bore therethrough from the bushing face to the component face; at least one damping element preload assembly including a cap screw having a threaded end, a spring retainer, a preload spring, and a damping element, the cap screw having the spring retainer and the preload spring inserted thereon, the cap screw received by the at least one preload bore with the threaded end extending therefrom on the component face, the cap screw having the damping element inserted thereover to abut the component/plate face; a bushing having a throughbore and a threaded outer portion; a rod having a threaded component end and an opposed lock nut end, the lock nut end having a threaded portion and an adjacent bushing receiving shaft portion, the bushing receiving shaft portion having an adjacent enlarged bushing stop portion toward the component end; the rod received by the rod bore in the damper, the component end of the rod bore extending therefrom on the component face, the bushing received over the lock nut end of the rod to abut the enlarged bushing stop portion with the bushing threaded outer portion threadably received by the threaded bushing receiving portion of the rod bore. This assembly can be attached directly or indirectly to the machine component.

According to one aspect of the present invention, an attachment assembly for dissipating energy of a moving machine component is provided, wherein the attachment assembly dissipates energy of the moving machine member in at least two directions of motion.

According to another aspect of the present invention, an attachment assembly for attenuating vibrations of a machine component is provided, comprising means for dissipating energy of the machine component in at least two directions.

According to yet another aspect of the present invention, an attachment assembly for dissipating energy of a moving machine component is provided, comprising at least one damper mass, at least one first preload assembly, each of the first preload assemblies having a first end coupled to the damper mass by a biasing element and a second end coupled to the machine component, at least one rod for mounting the at least one damper mass to the machine component and for applying a preload to the at least one first preload assembly, and at least one first damping element.

According to one embodiment of the present invention, an attachment assembly for dissipating energy of a moving machine component is provided, comprising at least a first damper mass and at least a second damper mass.

BRIEF DESCRIPTION OF THE DRAWINGS

A better understanding of the present invention will be had upon reference to the following description in conjunction with the accompanying drawings in which like numerals refer to like parts, and wherein:

FIG. 6 shows a representation of the various bores and openings in the damper mounting plate;

FIG. 7 shows a side view of the damper mounting plate of the mass face;

FIG. 8 shows representation of the various bores and openings in the damper mass;

FIG. 9 shows a side view of the damper mass of the bushing face;

DETAILED DESCRIPTION OF THE PREFERRED EMBODIMENTS

Figure 10:
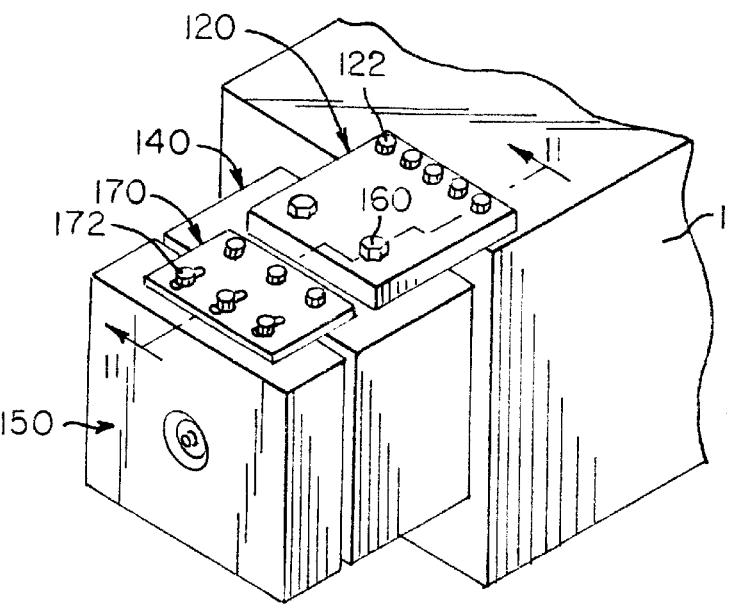
FIG. 10 shows the first alternative embodiment, a representation of a dual damper mass connected to a machine component using an intermediate damper mounting plate.
Figure 11:
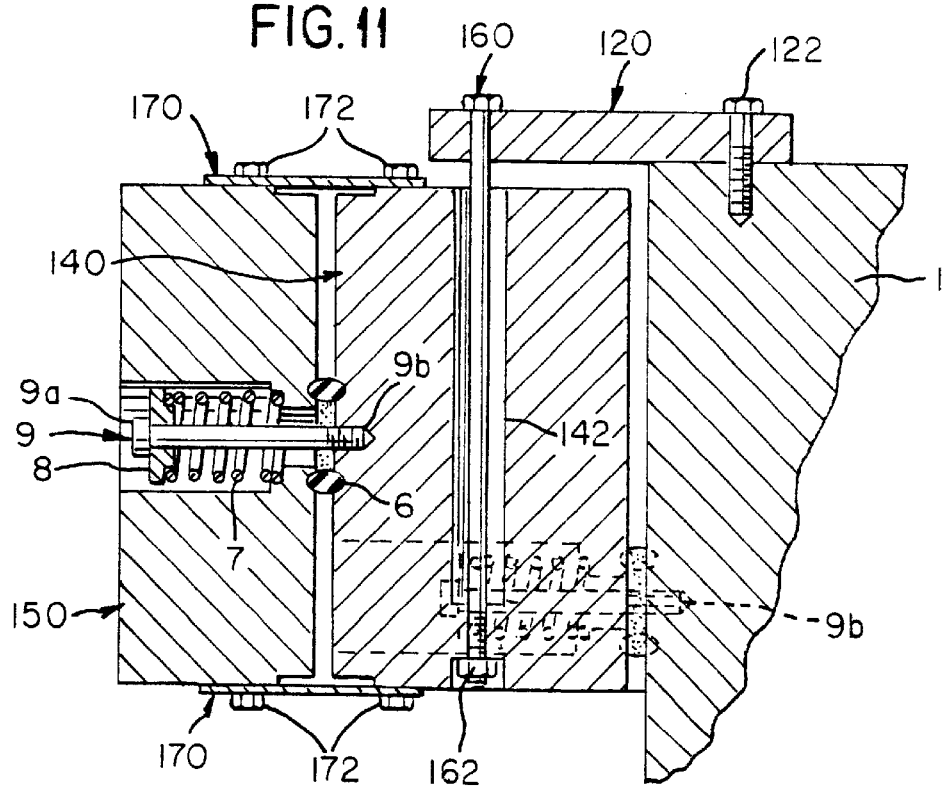
FIG. 11 shows a cross-section view of the first alternative embodiment of FIG. 10 along the section line 11—11.
Figure 12:
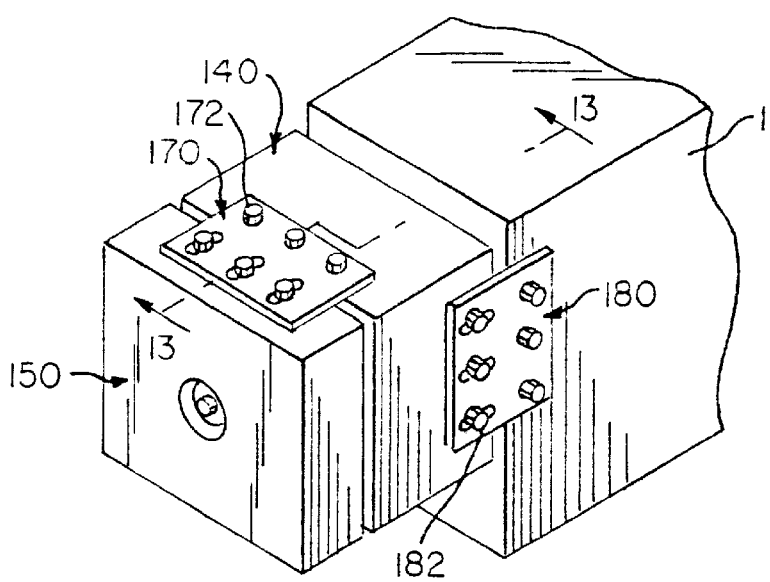
FIG. 12 shows the second alternative embodiment, a representation of a damper mass connected to a machine component using a pair of flexure plates.
Figure 13:
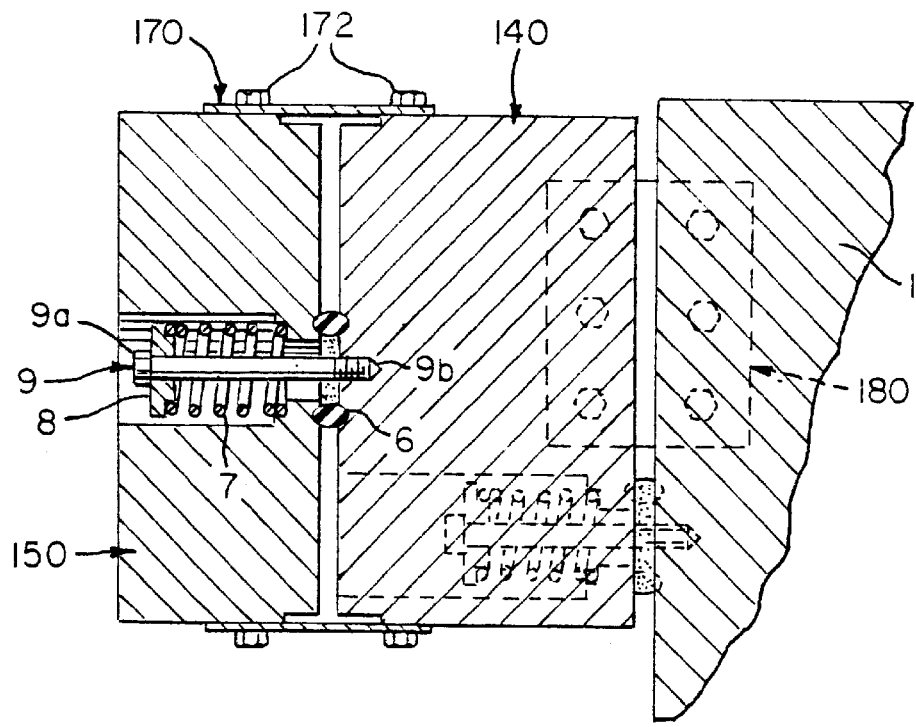
FIG. 13 shows a cross-section view of the second alternative embodiment of FIG. 12 along the section line 13—13; and, FIG. 14 shows a cross-section view of a rod having an asymmetrical cross-section which may be used in any of the embodiments hereof.

The preferred embodiment is shown in FIGS. 1–9, a first alternative embodiment is shown in FIGS. 10–11, and a second alternative embodiment is shown in FIGS. 12–13. The following list provides a cross-reference of the reference numerals used in FIGS. 1–13 to represent exemplary components of the several embodiments of the instant invention.

Figure 1:
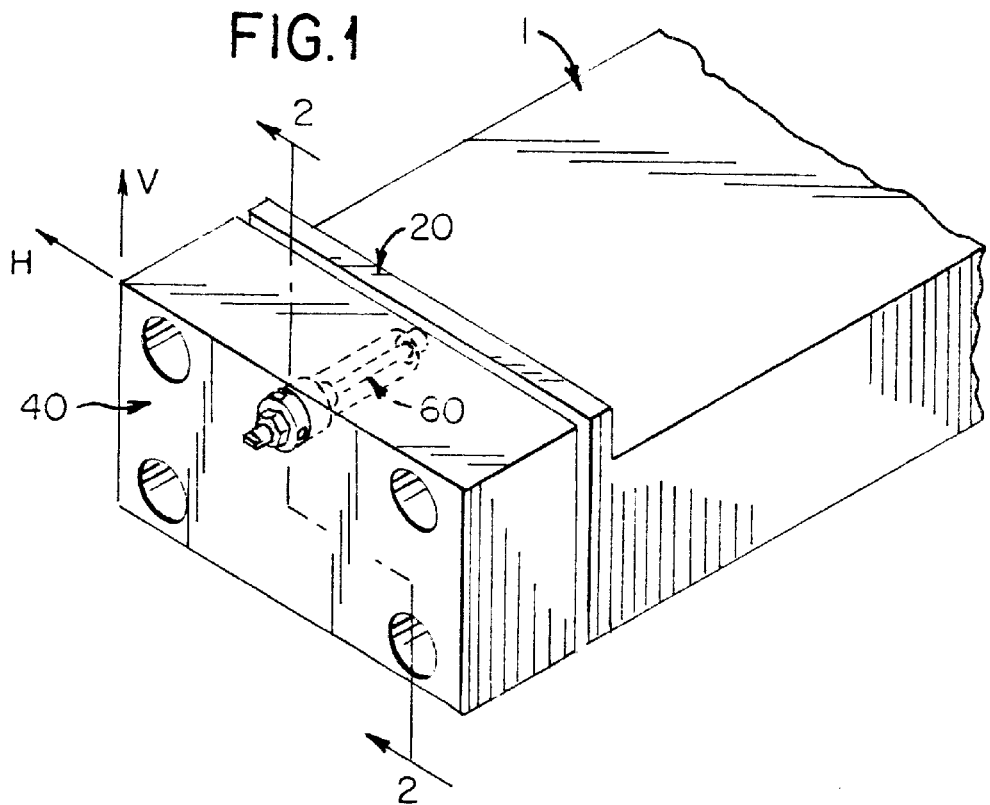
FIG. 1 shows the preferred embodiment, a representation of a damper mass connected to a machine component using an intermediate damper mounting plate.
Figure 2:
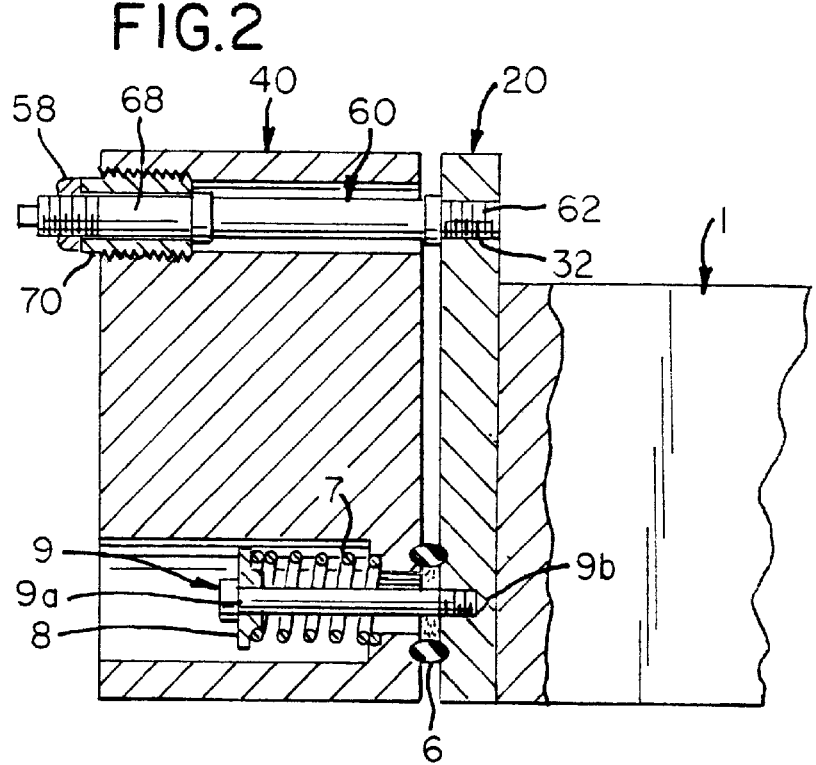
FIG. 2 shows a cross-section view of the preferred embodiment of FIG. 1 along the section line 2—2.
Figure 3:
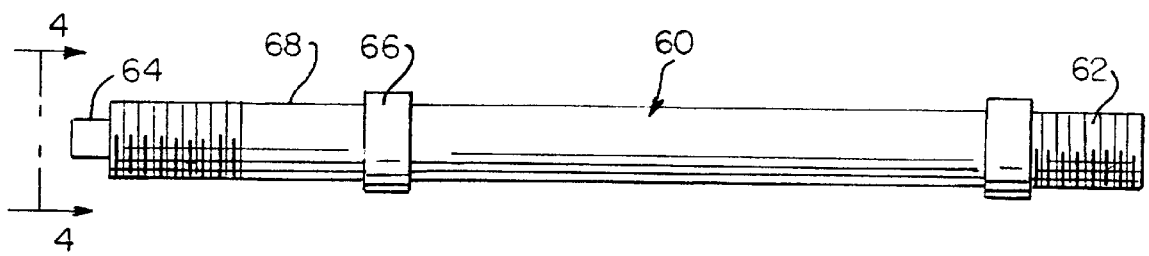
FIG. 3 shows a side view of the rod of the preferred embodiment.
Figure 4:
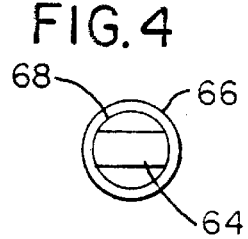
FIG. 4 shows an end view of the rod of FIG. 3 along the lines 4—4 of FIG. 3.

1 machine component
6 viscoelastic damping element
7 preload spring
8 spring retainer
9 cap screw
20 damper mounting plate
   22 component mounting bores
      24 countersunk head opening
      26 thread opening
   28 preload threaded bore
   30 damping element receptacle
   32 threaded rod bore
   34 component face
   36 mass face
40 damper mass
   42 preload countersunk bore
      43 spring seat
      44 spring receiving portion
      46 retainer bore
      47 damping element groove
   48 rod bore
      50 bushing receiving portion
      52 rod receiving portion
   54 bushing face
56 component face (depending on whether damper mass attaches to plate 20 or component 1)
58 lock nut
60 rod
   62 component end
   64 lock nut end
   66 enlarged bushing stop portion
   68 bushing receiving shaft portion
70 bushing
   72 through bore
   74 threaded portion
140 damper mass
   142 rod bore
150 damper mass
160 threaded rod
   162 rod nut
170 flexure plate
   172 bolt
180 flexure plate
   182 bolt With reference to FIGS. 1–9, the preferred embodiment of the instant invention is shown. FIGS. 1 and 2 show a general representation, while FIGS. 3, 5, 7, and 9 provide relative detail for one example, respectively showing rod 60, bushing 70, damper mounting plate 20, and damper mass 40. FIGS. 4, 6, and 8 provide additional views. The specific measurements provided with respect to FIGS. 3, 5, 7, and 9 are not limitations, but are given to explain how the related components may be sized so that those skilled in the art may resize the various components of the attachment assembly of the instant invention depending on the desired machine component application.

With reference to FIGS. 3 and 4, rod 60 is shown having a length of 309 mm. Rod 60 includes a lock nut end 64 and an opposed component end 62. From right to left, as shown in FIG. 3, rod 60 includes a 32 mm long-20 mm diameter threaded portion, a 13 mm long-28 mm diameter portion, a 165 mm long-20 mm diameter portion, a 13 mm long-28 mm diameter enlarged bushing stop portion 66, and a bushing receiving shaft portion 68 which includes a 34 mm long-20 mm diameter portion, a 40 mm long-20 mm diameter threaded portion, and a 12 mm long reduced portion. As seen in FIG. 4, this 12 mm long reduced portion at the lock nut end 64 has two flat sides. This permits the use of a wrench when threading component end 62 into its respective receiving threaded bore, for example, threaded rod bore 32 in damper mounting plate 20, shown in FIG. 7.

Figure 5:
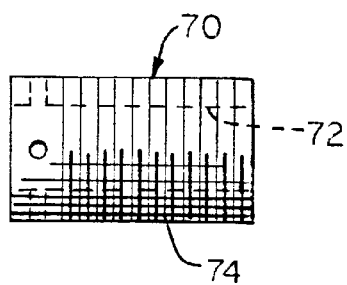
FIG. 5 shows a side view of the bushing of the preferred embodiment.

FIG. 5 shows the bushing 70, which is 70 mm in length and includes a 22 mm diameter throughbore 72. From right to left, as shown in FIG. 5, bushing 70 includes a 51 mm long threaded portion 74. Once bushing 70 is placed onto the lock nut end 64 of the rod 60, it abuts the enlarged bushing stop portion 66. As seen in FIG. 2 and explained in more detail hereinafter, bushing 70 is threaded into damper mass 40 and is used to couple the lock nut end 64 of the rod 60 to the damper mass 40. As shown in FIG. 5, opposed small bore holes (unnumbered) are provided in bushing 70 toward one side thereof. These holes permit a tool to be inserted thereinto to aid in threading the bushing 70 into damper mass 40.

FIGS. 6 and 7 relate to a damper mounting plate 20. As will be explained in the discussion of FIGS. 1 and 2, machine component 1 may have the damper mass 40 attached directly to it, if component 1 is of sufficient size, or it may have the damper mass 40 attached to it indirectly by using an intermediate damper mounting plate 20. FIG. 7 shows a mass face surface 36 of the damper mounting plate 20. FIG. 6 is a representation showing the relative thickness of the plate 20 so that the depth of the openings or bores therein can be seen in relation thereto.

Damper mounting plate 20 is about 38 mm thick. As shown in FIG. 7, damper mounting plate 20 is provided with six component mounting bores 22, three such component mounting bores 22 shown near the left-hand side of FIG. 7 and three such component mounting bores 22 shown on the right-hand side of FIG. 7. Each bore 22 includes a countersunk or enlarged head opening 24, which preferably is about 20 mm in diameter and about 18 mm deep, and a thread opening 26, which preferably is about 14 mm in diameter and about 20 mm deep. As seen in FIG. 6, each bore 22 passes completely through the mounting plate 20 and connects each head opening 24, provided in the mass face 36 of the mounting plate 20, with its respective thread opening 26, provided in the component face 34. Appropriate bolts(not shown) will be received by respective threaded bores (not shown) in machine component 1 to attach plate 20 to machine component 1. Because the head openings 24 are countersunk, the bolt heads situated therein will not interfere with the attachment of the damper mass 40 to the plate 20, as described in greater detail below.

As seen in FIG. 7, four preload threaded bores 28 are provided in the plate 20. As seen in FIG. 6, each of these bores 28 preferably has a diameter of about 12 mm and is about 32 mm deep and extends into the plate 20 from the mass face 36 towards the component face 34. A recessed damping element receptacle 30 is provided in the mass face 36 of the plate 20 surrounding each bore 36. Receptacles 30 are rounded and preferably have a maximum depth of about 4 mm for seating a damping element therein, as will be described in greater detail below.

As seen at the top center of FIG. 7, plate 20 preferably includes a 20 mm diameter threaded rod bore 32, which may be a throughbore. Rod bore 32 will receive the 32 mm long threaded portion of rod 60 at the component end 62 thereof and the adjacent 28 mm diameter portion of rod 60 will then abut mass face 36. Where rod bore 32 is threaded, the 32 mm long threaded portion of rod 60 may be threaded thereonto; where rod bore 32 is a throughbore, a nut (not shown) or other attachment device may be used to couple the rod bore 32 to the plate 20.

FIGS. 8 and 9 relate to a damper mass 40. As will be explained in the discussion of FIGS. 1 and 2, machine component 1 may have the damper mass 40 attached directly to it, if component 1 is of sufficient size, or it may have the damper mass 40 attached indirectly to it by using the previously explained intermediate damper mounting plate 20. FIG. 9 shows a bushing face surface 54 of the damper mass 40. FIG. 8 is a representation showing the relative thickness of the mass 40 so that the depth of the openings or bores therein can be seen in relation thereto.

Damper mass 40 preferably is about 203 mm thick. As shown in FIG. 9, damper mass 40 includes at least one preload bores 42, and preferably four preload bores 42 including two such preload bores 42 shown near the left-hand side of FIG. 9 and two such preload bores 42 shown near the right-hand side of FIG. 9. Each bore 42 includes a countersunk or enlarged spring receiving portion 44, which preferably is about 66 mm in diameter and about 180 mm deep, and a retainer bore portion 46, which preferably is about 31 mm in diameter. As seen in FIG. 8, spring receiving portion 44 extends inwardly from the bushing face 54 of the damper mass 40 and retainer bore portion 46 extends inwardly from the component face 56 of the damper mass 40 and communicates with the spring receiving portion 44 such that each bore 42 passes completely through the damper mass 40. A spring seat 43 may be provided in a radial step defined at the junction of the larger spring receiving portion 44 and the smaller retainer bore portion 46 to seat one end of the spring 7 thereon. The seat 43, if provided, will inhibit radial movement of the spring 7 within the spring receiving portion 44 of the bore 42 and will prevent any portion of the preload assembly from contacting an inner surface of the bore 42.

As seen at the top center of FIG. 9, damper mass 40 includes a rod bore 48 therethrough. With reference to FIG. 8, rod bore 48 includes a threaded bushing receiving portion 50 extending inwardly from the bushing face 54. Portion 50 preferably is about 39 mm in diameter and about 51 mm deep. Rod bore 48 also includes a rod receiving portion 52 extending inwardly from the component face 56 and communicating with the bushing receiving portion 50 such that bore 48 passes completely through the damper mass 40. Rod receiving portion 52 preferably is about 36 mm in diameter.

As shown in FIGS. 6 and 8, a small threaded hole (unnumbered) may be provided in the top center of both plate 20 and damper mass 40 so that a threaded eye-bolt or hook-like member can be temporarily threaded into either hole and used to help maneuver plate 20 or mass 40 into position on machine component 1.

With these relative dimensions of rod 60 (FIGS. 3 & 4), bushing 70 (FIG. 5), damper mounting plate 20 (FIGS. 6 & 7), and damper mass 40 (FIGS. 8 & 9), the connectivity is shown in FIGS. 1 and 2. Damper mounting plate 20 is attached to machine component 1, as was explained by the use of appropriate bolts received by the six component mounting bores 22 of plate 20 and threaded into appropriately aligned and sized threaded bores in machine component 1. If the surface of component 1 is of an adequate size, the damper mass 40 may attached directly to the component 1, rather than indirectly by mounting the damper mass 40 to the mounting plate 20 and thereafter mounting the mounting plate 20 to the machine component 1. Whether directly or indirectly attached, this damping mass 40 acts to deflect vibrations in both horizontal and vertical directions and to dissipate energy due to machine vibration thereby.

At least one, and preferably four, first identical damping element preload assemblies are used in the preferred embodiment. For each, a cap screw 9 passing through a retainer 8 (positioned near a cap end 9a of the cap screw 9, said cap end 9a defining a first end of the preload assembly) and having a biasing element such as a spring 7 thereon is inserted into spring receiving portion 44 of one bore 42 provided in damper mass 40. The spring 7 is stopped at the end of portion 44 adjacent smaller diameter retainer bore 46. Cap screw 9 passes through bore 46, exiting mass 40 and passes through a doughnut-shaped viscoelastic damping element 6 placed between mass 40 and plate 20, element 6 being partway received by damping element receptacle 30, receptacle 30 being shaped to help retain doughnut-shaped element 6 in proper position. A groove 47 at least partway encircles each retainer bore 46 in the component face 56 of the damper mass 40 and is sized and dimensioned to cooperate with corresponding receptacles 30 in the plate 20 so as to sandwich damping element 6 therebetween to prevent the damping element 6 from shifting out of position. A threaded end 9b of cap screw 9 opposite the cap end defines a second end of the preload assembly and is received by a preload threaded bore 28 in the mounting plate 20.

Damping element preload assembly combinations consisting of element 6, spring 7, retainer 8, and cap screw 9, are typical, and are used typically to attach a mass atop a component so that the weight of the mass rests atop elements 6. That is, in conventional uses, a preload assembly is mounted typically in a vertical orientation whereby a mass attached thereto urges the preload assembly under the influence of gravity against the bias of the spring 7, either in compression (such as where the preload assembly is positioned vertically below the mass) or in tension such as where the preload assembly is positioned vertically above the mass. However, in the instant invention, the mass 40 is mounted to the side of plate 20 or machine component 1. That is, a preload assembly of the present invention is mounted in a horizontal orientation. Employing only the multiple damping element preload assembly combinations of element 6, spring 7, retainer 8, and cap screw 9, for such a "side-hanging" orientation of the mass 40 would not adequately permit mass 40 to operate effectively.

Figure 14:
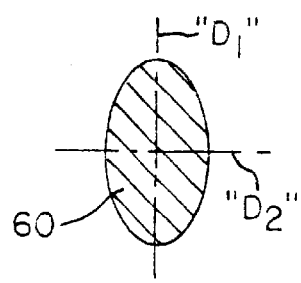

Therefore at first rod 60 and bushing 70 are provided to support mass 40 and to be attached thereto at the bushing face 54 of mass 40. Rod 60 is dimensioned to provide flexibility along both a horizontal axis ("H" in FIG. 1) and along a vertical axis ("V" in FIG. 1) and to have the same order of magnitude as the damping elements 6. Referring for the moment to FIG. 14, rod 60 may be dimensioned with a non-symmetric cross-section to provide different stiffnesses along different axes. For example, the cross-section of the rod 60 may be elliptical whereby a major axis of the ellipse along a first direction or axis "$D_1$" provides a greater stiffness than a minor axis thereof along a second direction or axis "$D_2$". Axes "$D_1$" and "$D_2$" may or may not be orthogonal. Alternatively, different stiffnesses of a symmetric rod 60 may be provided such as through the judicious selection of an anisotropic material. This would allow the damper assembly to be tuned for slightly different frequencies by influence of the different stiffness of the rod for example in the horizontal and vertical directions. Bushing 70 provides moment stiffness to the lock nut end 64 of the rod 60, permitting "S-shape" motion of the rod 60 along most of its length, rather than pure bending, thereby reducing lateral stress.

With the four damping element preload assemblies (comprising element 6, spring 7, retainer 8, and cap screw 9) being installed to attach mass 40 to the plate 20, the rod 60 can be passed through the rod bore 48 of the mass 40 and have the threaded portion at the component end 62 thereof threaded into plate 20 threaded bore 32; for example, by using a wrench on the opposed flat sides of the smaller 12 mm portion of rod 60 at its lock nut end 64 (see, FIGS. 3 & 4). Then, bushing 70 is placed over lock nut end 64 of rod 60 and threaded portion 74 of bushing 70 is threaded into threaded bushing receiving portion 50 of rod bore 48 of mass 40; for example, by inserting a tool through two of the small bores seen on the left side of bushing 70 in FIG. 5 and turning the tool. This allows preloading with the springs 7 first so that subsequent positioning of the bushing 70 in the correct location does not detract from the springs 7 applied preload. Bushing 70 is threaded further so that it passes over bushing receiving shaft portion 68 of rod 60 to engage or abut enlarged bushing stop portion 66 of rod 60. Then, lock nut 58 can be threaded onto lock nut end 64 of rod 60.

It is noted that the rod 60 preferably has a much higher axial stiffness than radial or lateral stiffness. This prevents the mass 40 from rocking off the damper elements 6 during high acceleration or deceleration moves of the machine component 1.

A first alternative embodiment is shown in FIGS. 10 and 11. In this embodiment a first damper mass 150 and a second damper mass 140 are employed with machine component 1. Second damping element preload assemblies, identical in construction to first damping element preload assemblies described above and particularly comprising element 6, spring 7, retainer 8, and cap screw 9, are used to attach first damper mass 150 to the second damper mass 140. Second damper mass 140 is attached to the machine component 1 and at least one second damping element 6 is positioned between the first damper mass 150 and the second damper mass 140. A mounting plate 120 is attached to machine component 1 using bolts 122. A rod 160 with a threaded end passes vertically downwardly through plate 120 and through a rod bore 142 of the second mass 140. A rod nut 162 is threaded onto the threaded end of rod 160 to suspend the second mass 140 and to adjust the positioning of the first damping element preload assemblies between the second mass 140 and the machine component 1. This mass 140 arrangement closest to the machine component 1 allows damping of horizontal motion, but not vertical motion to any significant degree. The second mass 140 is attached to the machine component 1, as above, using first damping element preload assemblies, again comprising element 6, spring 7, retainer 8, and cap screw 9, and a pair of flexure plates 170. Plates 170 are attached to the top and bottom of masses 140 and 150 using bolts 172. Plates 170 are dimensioned to permit vertical motion by plate flexing. The plate 170 width is sized to prevent horizontal motion, thus adding to the effective mass in the horizontal plane. The first mass 150 and plates 170 are tuned specifically to damp vertical modes of vibration, while the sum of masses 140 and 150 are tuned to damp horizontal modes of vibration.

A second alternative embodiment is shown in FIGS. 12 and 13. Here, masses 140 and 150 are attached and flexure plates 170 are employed as with the first alternative embodiment shown in FIGS. 10 and 11. However, mounting plate 120 and rod 160 are not used to attach mass 140 to machine component 1. Instead, a pair of flexure plates 180 are attached on the sides of mass 140 and machine component 1 using bolts 182. As with the first alternative embodiment of FIGS. 10 and 11, top and bottom attached flexure plates 170 of FIGS. 12 and 13 are dimensioned to permit vertical motion by plate flexing, with the plate 170 width being sized to prevent horizontal motion. In contrast, side attached flexure plates 180 are dimensioned to permit horizontal motion by plate flexing, with the plate 180 width being sized to prevent vertical motion.

The preferred embodiment of FIGS. 1–9, the first alternative embodiment of FIGS. 10–11, and the second alternative embodiment of FIGS. 12–13, are all drawn to a vibration damper which provides means for damping in two separate axes of motion. The embodiments employ either a single mass 40 or dual masses 140, 150 and all employ damping element preload assemblies comprising element 6, spring 7, retainer 8, and cap screw 9, to directly or indirectly attach the respective mass 40 or 140 to the machine component 1 and to dissipate energy thereby. With FIGS. 1–9, the single mass 40 is attached to the side of machine component 1 indirectly employing a damper mounting plate 20. With the embodiment of FIGS. 10–11, the mass 140 is attached directly to the side of machine component 1 using damping element preload assemblies comprising element 6, spring 7, retainer 8, and cap screw 9, with an additional vertical threaded rod 160 passing downward through a horizontal plate 120 and a bore 142 in mass 140 to support mass 140 and to assist in retaining it in proper alignment with machine component 1. With the embodiment of FIGS. 12–13, the mass 140 is attached directly to the side of machine component 1 using damping element preload assemblies comprising element 6, spring 7, retainer 8, and cap screw 9, with a pair of side flexure plates 180 attaching the sides of mass 140 and machine component 1. In both embodiments of FIGS. 10–11 and 12–13, mass 140 and mass 150 are attached using damping element preload assemblies comprising element 6, spring 7, retainer 8, and cap screw 9, with a pair of top and bottom flexure plates 170 attached to both the top and bottom of masses 140 and 150.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

We claim:

1. An attachment assembly for dissipating energy of a moving machining component in at least two directions of motion, comprising:
    at least one damper mass;
    at least one first preload assembly, each said first preload assembly having a first end coupled to said damper mass by a biasing element and a second end coupled to said machine component;
    at least one rod for mounting said at least one damper mass to the machine component and for applying a preload to said at least one first preload assembly; and,
    at least one first damping element.

2. The attachment assembly of claim 1, wherein:
    said at least one damper mass includes at least one preload bore therethrough;
    said at least one first preload assembly includes a cap screw having a cap end and a threaded end opposite said cap end;
    said at least one first preload assembly includes a retainer for coupling said biasing element to said cap end of said cap screw; and wherein
        said cap end of said cap screw is coupled to said damper mass by said biasing element, and said threaded end extends at least partway through said at least one preload bore and is coupled to said machine component.

3. The attachment assembly of claim 1, wherein said attachment assembly attenuates vibration of said machine component.

4. The attachment assembly of claim 1, wherein said at least two directions of motion includes a first direction along a horizontal axis and a second direction along a vertical axis.

5. The attachment assembly of claim 1, wherein said biasing element is a spring.

6. The attachment assembly of claim 1, wherein said at least one first damping element is constructed from a viscoelastic material.

7. The attachment assembly of claim 1, wherein said at least one damper mass is mounted to said machine component by a mounting plate.

8. The attachment assembly of claim 1, wherein said at least one first damping element is positioned between said at least one damper mass and said machine component.

9. The attachment assembly of claim 1, wherein said at least one rod includes a symmetric cross-section.

10. The attachment assembly of claim 1, wherein said at least one rod includes a first stiffness oriented along a first axis and a second stiffness oriented along a second axis.

11. The attachment assembly of claim 10, wherein said at least one rod includes a non-symmetric cross-section.

12. The attachment assembly of claim 1, wherein said at least one damper mass includes a first damper mass and a second damper mass.

13. The attachment assembly of claim 12, wherein said first damper mass is affixed to said second damper mass by at least one flexure plate.

14. The attachment assembly of claim 12, further comprising at least one second preload assembly, each of said at least one second preload assembly having a first end coupled to said first damper mass by a biasing element and a second end coupled to said second damper mass.

15. The attachment assembly of claim 12, further comprising at least one second damping element.

16. The attachment assembly of claim 15, wherein said at least one second damping element is positioned between said first damper mass and said second damper mass.

17. The attachment assembly of claim 1, wherein said at least one damper mass includes a rod bore extending through said damper mass and having a bushing receiving portion at a first end thereof and a rod receiving portion at a second end thereof, a lock nut end of said rod being coupled to said bushing receiving portion of said rod bore by a bushing, wherein a component end of said rod opposite said lock nut end extending at least partway through said rod receiving portion of said rod bore, and wherein said component end of said rod is coupled to said machine component.

* * * * *